(12) United States Patent
Moriarty et al.

(10) Patent No.: US 7,905,665 B2
(45) Date of Patent: Mar. 15, 2011

(54) OPTICAL CONNECTOR

(75) Inventors: Thomas Moriarty, Cork (IE); Patrick Doyle, Cork (IE)

(73) Assignee: Firecomms Limited, Cork (IE)

( * ) Notice: Subject to any disclaimer, the term of this patent is extended or adjusted under 35 U.S.C. 154(b) by 0 days.

(21) Appl. No.: 12/585,100

(22) Filed: Sep. 3, 2009

(65) Prior Publication Data

US 2010/0021112 A1     Jan. 28, 2010

Related U.S. Application Data

(63) Continuation of application No. 11/812,719, filed on Jun. 21, 2007, now Pat. No. 7,597,485.

(30) Foreign Application Priority Data

Jun. 21, 2006  (IE) .................................... 2006/0465

(51) Int. Cl.
*G02B 6/36*  (2006.01)
(52) U.S. Cl. ........................................... 385/89; 385/70
(58) Field of Classification Search ................... 385/53, 385/56, 58, 59, 73, 76, 77, 78, 81, 83, 92, 385/139, 70, 89; 403/32, 322.1; 398/141
See application file for complete search history.

(56) References Cited

U.S. PATENT DOCUMENTS

| | | | |
|---|---|---|---|
| 3,188,380 A | 6/1965 | Lorenz | 174/75 R |
| 3,450,424 A | 6/1969 | Calisher | 285/305 |
| 3,471,816 A | 10/1969 | Giegerich | 337/195 |
| 3,504,328 A | 3/1970 | Olsson | 439/79 |
| 3,588,607 A | 6/1971 | Ristuccia et al. | 61/41 |
| 3,617,990 A | 11/1971 | Colardeau | 439/88 |
| 3,847,421 A | 11/1974 | Eschbaugh et al. | 285/353 |
| 3,946,467 A | 3/1976 | Lukas et al. | 24/537 |
| 3,947,182 A | 3/1976 | McCartney | 385/54 |
| 4,009,896 A | 3/1977 | Brewer | 285/305 |
| 4,050,783 A | 9/1977 | Tardy | 385/64 |
| 4,162,119 A * | 7/1979 | Goodman | 385/60 |
| 4,193,665 A * | 3/1980 | Arnold | 385/72 |
| 4,217,031 A * | 8/1980 | Mignien et al. | 385/64 |
| 4,223,979 A | 9/1980 | Piter et al. | 385/64 |
| 4,268,115 A * | 5/1981 | Slemon et al. | 385/88 |

(Continued)

FOREIGN PATENT DOCUMENTS

DE         198 09 806       9/1999

(Continued)

*Primary Examiner* — Charlie Peng
*Assistant Examiner* — Peter Radkowski
(74) *Attorney, Agent, or Firm* — Jacobson Holman PLLC (57) ABSTRACT

An optical connector includes four main components, namely a clamp; a housing into which the clamp slides; two optical elements, a transmitter and a receiver; and an EMI metal shield surrounding the elements. The clamp has two parallel through holes for receiving fiber terminations, each through-hole having a generally conical mouth for convenient guidance of a fiber termination. Inside of the through-holes there are side resilient clamp members, and there is a single central clamp member. The clamp is of moulded plastics construction, and the clamp members are resilient in the lateral plane. The central clamp member on the other hand has little flexibility and remains essentially static throughout the clamping operation. Each resilient clamping member has a tooth at its end for snap-fitting engagement with the housing at open and closed positions. Fiber terminations are inserted through the clamp mouths and the through-holes and into the sockets of the housing. The clamp is then simply pushed inwardly so that teeth in the socket walls bite into the fiber claddings.

21 Claims, 13 Drawing Sheets

U.S. PATENT DOCUMENTS

| | | | |
|---|---|---|---|
| 4,275,372 A | 6/1981 | Eley | 337/4 |
| 4,279,467 A * | 7/1981 | Borsuk et al. | 385/65 |
| 4,306,766 A * | 12/1981 | Karol | 385/65 |
| 4,325,607 A * | 4/1982 | Carlsen | 385/70 |
| 4,374,606 A * | 2/1983 | Lathrop | 439/585 |
| 4,392,708 A | 7/1983 | Bailey et al. | 439/668 |
| 4,392,713 A | 7/1983 | Piter et al. | 385/64 |
| 4,426,127 A * | 1/1984 | Kubota | 439/607.17 |
| 4,483,584 A | 11/1984 | Gresty | 385/64 |
| 4,512,766 A | 4/1985 | Vailancourt | 604/167.03 |
| 4,606,603 A | 8/1986 | Cairns | 385/58 |
| 4,662,962 A * | 5/1987 | Malavieille | 156/158 |
| 4,691,943 A | 9/1987 | DeLand et al. | 285/315 |
| 4,697,859 A * | 10/1987 | Fisher, Jr. | 439/246 |
| 4,708,428 A * | 11/1987 | Loeffler et al. | 385/87 |
| 4,728,171 A | 3/1988 | Schofield et al. | 385/135 |
| 4,735,480 A * | 4/1988 | Levinson et al. | 385/58 |
| 4,747,658 A * | 5/1988 | Borsuk et al. | 385/78 |
| 4,779,952 A * | 10/1988 | Hayashi et al. | 385/66 |
| 4,875,755 A | 10/1989 | Borgos et al. | 385/78 |
| 4,925,403 A | 5/1990 | Zorzy | 439/578 |
| 4,941,727 A | 7/1990 | Maranto et al. | 385/81 |
| 4,941,846 A | 7/1990 | Guimond et al. | 439/578 |
| 4,944,698 A | 7/1990 | Siemon et al. | 439/676 |
| 4,986,625 A | 1/1991 | Yamada et al. | 350/96.2 |
| 5,028,117 A | 7/1991 | Muhlenkamp-Becker | 385/117 |
| 5,052,725 A | 10/1991 | Meyer et al. | 285/308 |
| 5,058,985 A | 10/1991 | Davenport et al. | 385/115 |
| 5,073,042 A * | 12/1991 | Mulholland et al. | 385/69 |
| 5,078,515 A | 1/1992 | Soulard et al. | 385/89 |
| 5,095,517 A | 3/1992 | Monguzzi et al. | 385/90 |
| 5,101,463 A * | 3/1992 | Cubukciyan et al. | 385/72 |
| 5,104,242 A | 4/1992 | Ishikawa | 385/53 |
| 5,115,375 A | 5/1992 | Garay | 361/760 |
| 5,125,059 A | 6/1992 | Wall | 385/81 |
| 5,134,674 A * | 7/1992 | Huber | 385/61 |
| 5,142,602 A | 8/1992 | Cabato et al. | 385/87 |
| 5,177,803 A | 1/1993 | Newhouse et al. | 385/43 |
| 5,222,772 A | 6/1993 | McGraw | 285/323 |
| 5,233,674 A | 8/1993 | Vladic | 385/76 |
| 5,265,182 A | 11/1993 | Hartley | 385/77 |
| 5,285,510 A * | 2/1994 | Slaney | 385/78 |
| 5,315,684 A | 5/1994 | Szegda | 385/139 |
| 5,317,663 A * | 5/1994 | Beard et al. | 385/70 |
| 5,325,454 A | 6/1994 | Rittle et al. | 385/76 |
| 5,337,385 A | 8/1994 | Baderschneider et al. | 385/59 |
| 5,359,688 A * | 10/1994 | Underwood | 385/70 |
| 5,366,315 A * | 11/1994 | Hartley | 403/326 |
| 5,386,486 A | 1/1995 | Fan et al. | 385/59 |
| 5,399,045 A | 3/1995 | Yoneda et al. | 403/321 |
| 5,434,941 A | 7/1995 | Bechtel et al. | 385/94 |
| 5,487,123 A * | 1/1996 | Fowble | 385/70 |
| 5,528,712 A * | 6/1996 | Belenkiy et al. | 385/78 |
| 5,595,499 A * | 1/1997 | Zander et al. | 439/352 |
| 5,737,464 A * | 4/1998 | Underwood et al. | 385/72 |
| 5,774,612 A * | 6/1998 | Belenkiy et al. | 385/72 |
| 5,799,122 A | 8/1998 | Jeong et al. | 385/59 |
| RE35,935 E | 10/1998 | Cabato et al. | 385/87 |
| 5,828,804 A * | 10/1998 | Akins et al. | 385/58 |
| 5,847,759 A | 12/1998 | Williams et al. | 348/363 |
| 5,852,697 A | 12/1998 | Williams et al. | 385/93 |
| 5,954,535 A | 9/1999 | Lawrence | 439/439 |
| 6,081,647 A * | 6/2000 | Roth et al. | 385/139 |
| 6,106,162 A * | 8/2000 | Mrakovich et al. | 385/88 |
| 6,132,238 A | 10/2000 | Hartmann et al. | 439/439 |
| 6,139,194 A * | 10/2000 | Bella et al. | 385/73 |
| 6,179,480 B1 | 1/2001 | Bella et al. | 385/76 |
| 6,193,420 B1 | 2/2001 | Sikorski, Jr. | 385/55 |
| 6,203,208 B1 * | 3/2001 | Stupar | 385/73 |
| 6,283,640 B1 | 9/2001 | Stephenson et al. | 385/58 |
| 6,283,644 B1 * | 9/2001 | Gilliland et al. | 385/93 |
| 6,293,706 B1 | 9/2001 | Strike et al. | 385/53 |
| 6,318,905 B1 * | 11/2001 | Valencia et al. | 385/78 |
| 6,367,984 B1 | 4/2002 | Stephenson et al. | 385/53 |
| 6,422,759 B1 | 7/2002 | Kevern | 385/60 |
| 6,424,758 B1 | 7/2002 | Cheng | 385/16 |
| 6,431,762 B1 * | 8/2002 | Taira et al. | 385/56 |
| 6,431,763 B1 | 8/2002 | Sherman et al. | 385/81 |
| 6,435,728 B2 * | 8/2002 | Shimoji et al. | 385/56 |
| 6,461,054 B1 | 10/2002 | Iwase | 385/73 |
| 6,464,408 B1 | 10/2002 | Nolan | 385/87 |
| 6,488,545 B1 | 12/2002 | Meyer | 439/680 |
| 6,524,014 B2 * | 2/2003 | Stephenson et al. | 385/55 |
| 6,580,865 B1 | 6/2003 | Doorn | 385/134 |
| 6,604,862 B2 * | 8/2003 | Rogge et al. | 385/56 |
| 6,736,173 B1 | 5/2004 | Grisley et al. | 144/145.3 |
| 6,743,061 B2 | 6/2004 | Jaegerskuepper | 439/834 |
| 6,804,436 B2 | 10/2004 | Healy | 385/33 |
| 6,814,608 B2 | 11/2004 | Kollmann | 439/441 |
| 6,863,444 B2 | 3/2005 | Anderson et al. | 385/53 |
| 6,916,119 B2 * | 7/2005 | Okochi et al. | 385/78 |
| 6,951,425 B2 | 10/2005 | Vergeest | 385/59 |
| 7,014,370 B2 | 3/2006 | Chudoba | 385/84 |
| 7,014,497 B2 | 3/2006 | Lange | 439/441 |
| 7,036,997 B2 | 5/2006 | Katsuyama et al. | 385/73 |
| 7,048,449 B2 | 5/2006 | Frojdh et al. | 385/88 |
| 7,056,308 B2 | 6/2006 | Utterberg | 604/256 |
| 7,153,036 B2 | 12/2006 | Healy et al. | 385/78 |
| 7,182,524 B2 * | 2/2007 | Kramer et al. | 385/78 |
| 7,233,731 B2 * | 6/2007 | Solheid et al. | 385/135 |
| 7,244,066 B2 | 7/2007 | Theuerkorn | 385/53 |
| 7,322,752 B2 | 1/2008 | Endou et al. | 385/92 |
| 7,329,143 B2 | 2/2008 | Schrader et al. | 439/441 |
| 7,455,549 B2 * | 11/2008 | Rodrigues et al. | 439/578 |
| 7,457,503 B2 * | 11/2008 | Solheid et al. | 385/135 |
| 2001/0019647 A1 | 9/2001 | Okochi et al. | 385/78 |
| 2002/0048435 A1 * | 4/2002 | Scanzillo | 385/81 |
| 2002/0076964 A1 * | 6/2002 | Weisz-Margulescu | 439/263 |
| 2002/0131721 A1 | 9/2002 | Gaio et al. | 385/60 |
| 2002/0191919 A1 | 12/2002 | Nolan | 385/78 |
| 2004/0057676 A1 | 3/2004 | Doss et al. | 385/81 |
| 2004/0071407 A1 | 4/2004 | Vergeest | 385/58 |
| 2004/0146252 A1 | 7/2004 | Healy et al. | 385/88 |
| 2004/0258364 A1 | 12/2004 | Frojdh et al. | 385/74 |
| 2004/0258365 A1 | 12/2004 | Chudoba | 385/78 |
| 2006/0002662 A1 * | 1/2006 | Manning et al. | 385/78 |
| 2006/0067631 A1 | 3/2006 | Wang et al. | 385/92 |
| 2006/0078261 A1 | 4/2006 | Endou et al. | 385/92 |
| 2007/0041732 A1 * | 2/2007 | Oki et al. | 398/141 |
| 2007/0278006 A1 | 12/2007 | Gardner | 174/659 |

FOREIGN PATENT DOCUMENTS

| | | |
|---|---|---|
| EP | 1 065 543 | 1/2001 |
| FR | 2 863 367 | 6/2005 |
| JP | 05157946 A * | 6/1993 |
| WO | 2005/054919 | 6/2005 |

* cited by examiner p

Fig. A

Prior Art

OPTICAL CONNECTOR

This application is a Continuation application of U.S. patent application Ser. No. 11/812,719, filed Jun. 21, 2007, now U.S. Pat. No. 7,597,485, which claims priority to the Irish application 2006/0465 filed Jun. 21, 2006, which is incorporated by reference herein.

INTRODUCTION

1. Field of the Invention

The invention relates to coupling of optic fibres with optical elements or other fibres.

2. Prior Art Discussion

Optical fibres are commonly used for transmitting light from one location to another, either to communicate data (by switching on and off the light, or by varying its intensity) or to provide illumination. At one or both ends of the optical fibre it is necessary to couple the fibre to an optical element. This element may be a light transmitting element, from which light will enter the fibre; a light detecting element, to detect light transmitted through the fibre; a light guide of some other type, for example a lens to guide light to or from the end of the fibre; or the end of another fibre, in cases where a number of fibres are coupled together to accomplish a purpose.

Optical Fibres may be made of glass (silica), or of plastics (such as PMMA or Polycarbonate) or of a composite construction, such as a silica core with a cladding of a polymer material, having a refractive index different from that of the silica, so guiding the light within the fibre.

Large core (for example 1 mm) plastic optical fibre (POF) is an alternative to glass optical fibre. Generally, it can be used for data communication applications for shorter links. One of the most important features of POF is the relative ease with which it can be prepared for coupling to optical elements. This makes it very attractive for use in home or industrial communication networks. Also, because POF can be prepared with larger diameters than glass fibre, it is more practical for distributing light, when it is desired to provide illumination at a distance from the light source, for example to provide illumination in multiple places from a single light source, or to provide illumination underwater while keeping the electrically operated light source away from the water.

Optical fibres are typically manufactured with a jacket over the fibre, for example, a plastic optical fibre may be made with a diameter of 1 mm, and then a covering of polyethylene, PVC or similar material is added to bring the total diameter up to 2.2 mm.

The coupling systems presently used for optical fibres typically involve the fitting of a plug to the fibre that can be mated with a socket containing an optical element, such as a light source or detector.

Couplers have also been developed which do not require the fibre to be fitted with a plug, and provide means for aligning a fibre with an optical element and retaining it in position. Such a coupler carries a nut and a body provided with a hole into which an optical fibre may be inserted. On the outside of the body there is a screw thread and a tapered shape. The nut screws onto this thread, and pushes the two sides of the body together. When the nut is loose, an optical fibre can be inserted into the hole so that the end of it is guided to be in contact with the appropriate part of the electro-optical element. If the nut is then tightened, the two sides of the body will be pressed together by the action of the taper, and they will grip the fibre so as to hold it in place.

When two fibres are to be used together, the two outer jackets are commonly moulded together, forming a "figure-of-eight" cable. To insert such a cable into connectors, it is necessary to separate the two strands so that each may be inserted into the appropriate location. If this is done by hand, or by the use of low-cost tooling, some damage or additional material may be present on the circumference of the jacket of each strand where they have been separated. Where the strands have separated, each has a projection where they were originally joined, as indicated in Fig. A with the letter P. When the strand is inserted into a locating hole this additional material may cause the cable to be eccentric in the hole. This may interfere with the proper alignment between the core of the optical fibre and the optical element.

The invention is therefore directed towards allowing the coupling of optical fibres to optical elements or other fibres, without the necessity of fitting a plug to the optical fibre.

Another objective is to provide for retaining the fibre securely, but allowing it to be easily released.

Another objective is to achieve relatively low cost for fibre coupling, and/or to occupy reduced space in the equipment, and/or to optimise the coupling between the fibre and the optical element, and/or to minimise the time taken to retain or release the fibres.

SUMMARY OF THE INVENTION

According to the invention there is provided an optical connector comprising:
  a housing comprising:
    at least one socket for a fibre termination, each socket having a resilient wall for pressing against a fibre termination inserted in the socket, and a housing side wall to a lateral side of the socket; and
  a clamp comprising at least one clamp member for sliding in the housing in a direction generally parallel to the socket between outer and inner positions in the housing, at least one of said clamp members sliding in contact with the housing wall on one side and with a socket resilient wall on the opposed side so that it laterally urges the socket resilient wall to grip a fibre termination in the socket.

In one embodiment, each clamp member engaging the housing wall has a projection at its extremity, and the housing wall is configured to limit movement of the clamp member by engagement with the projection.

In one embodiment, the housing wall has a recess for snap-fitting with the projection to define an outer, open, position.

In one embodiment, the housing wall has a recess for snap-fitting with the projection to define an, inner, closed position.

In one embodiment, the clamp further comprises a through hole for training a fibre termination through the clamp and into the socket.

In another embodiment, the through hole has a tapered mouth.

In one embodiment, the clamp is wider at the mouth to provide a finger-grip portion.

In one embodiment, lateral external surfaces of the clamp are curved outwardly and laterally towards an outer extremity of the clamp.

In one embodiment, the socket resilient wall has a projection for pinching a fibre termination in the socket.

In a further embodiment, each socket comprises a pair of opposed resilient walls, each for lateral movement for gripping a fibre termination.

In one embodiment, the housing comprises a pair of parallel sockets, the clamp has a resilient clamp member area on each lateral side of the pair of sockets, and the clamp further comprises a central clamp member between the sockets and for urging socket resilient walls to grip a fibre termination.

In one embodiment, the central clamp member has tapered surfaces for sliding engagement with the socket resilient walls as the clamp moves between the open and closed positions.

In one embodiment, each socket comprises a longitudinal recess to accommodate excess material along the length of a fibre termination.

In another embodiment, the housing further comprises a compartment for retaining an optical element in registry with a fibre termination in the socket.

In one embodiment, the compartment is behind a separating wall through which each socket passes.

In one embodiment, the coupler further comprises a metal shield partly surrounding the compartment, and the compartment comprises a formation for engagement with the metal shield.

In one embodiment, the compartment comprises divider projections for alignment of optical element legs.

In one embodiment, the shield has five sides, with an open bottom end for sliding downwardly around the compartment, and at lest one tab for folding to engage the housing to retain the shield in place.

In one embodiment, the shield comprises a dividing wall for separation of optical elements.

In one embodiment, the tabs are configured to retain optical elements in position in the compartment.

In one embodiment, the dividing wall is configured to provide optical shielding between adjacent optical elements in the compartment.

In a further embodiment, the housing comprises at least two aligned sockets and there is a clamp at each end of the housing for clamping opposed fibre terminations in an end-to-end configuration.

In one embodiment, the housing comprises a transparent membrane between the aligned sockets.

In one embodiment, the sockets are arranged for abutment of opposed fibre termination ends, with a restriction to limit fibre movement at an abutment position.

In another aspect, the invention provides an optical connector comprising:
a housing comprising:
  at least one socket for a fibre termination, each socket having a resilient wall for pressing against a fibre termination inserted in the socket, and
a clamp comprising at least one clamp member for sliding in the housing in a direction generally parallel to the socket between outer and inner positions in the housing, at least one of said clamp members sliding in contact with a socket resilient wall so that it laterally urges the socket resilient wall to grip a fibre termination in the socket.

DETAILED DESCRIPTION OF THE INVENTION

Brief Description of the Drawings

The invention will be more clearly understood from the following description of some embodiments thereof, given by way of example only with reference to the accompanying drawings in which:—

Fig. A is a diagram showing a projection P which exists when strands of a "figure-of-eight" cable is separated.

DETAILED DESCRIPTION OF THE PREFERRED EMBODIMENTS

Referring to FIGS. 1 to 10 an optical connector 1 comprises four main components, namely:
2, a clamp;
3, a housing into which the clamp 2 slides;
4, two optical elements, a transmitter and a receiver; and
5, an EMI metal shield surrounding the elements 4.

The clamp 2 has two parallel through holes 10 and 11 for receiving fibre terminations, each through-hole having a generally conical mouth 17, 18 for convenient guidance of a fibre termination. Inside of the through-holes 10 and 11 there are side resilient clamp members 12, and there is a single central clamp member 13. The clamp 2 is of moulded plastics construction, and the clamp members 12 are resilient in the lateral plane. The central clamp member 13 on the other hand has little flexibility and remains essentially static throughout the clamping operation. Each resilient clamping member 12 has a tooth 15 at its end for snap-fitting engagement with the housing 3 at open and closed positions, as described in more detail below.

The outer end of the clamp 2, with its flared-out configuration, provides a convenient finger grip 19. Also, the conical mouths 17 and 18 provide for particularly convenient insertion of fibre terminations.

The housing 3 has a pair of rigid side walls 31 between which are two sockets 30, each having a resilient curved side wall 32 and a resilient curved central wall 33. There is a gap top and bottom between the walls 32 and 33 to allow them to move closer together to pinch a fibre termination inserted into the socket 30. The pinching is effected by a ridge 35 on each wall of each socket. The socket 30 walls 33 also include a longitudinal recess, not shown, for accommodating excess cladding material arising from the figure-of-eight arrangement. Such material is indicated as P in Fig. A.

The housing 3 also comprises a receiver 20 on each side, each to accommodate a resilient clamp member 12. Each receiver 20 comprises an outer recess 21 and an inner recess 22, the former for snap-fitting engagement with the tooth 15 of the member 12 at an open position, and the latter for engagement with the same projection at a closed position. The sockets 30 extend through a partition wall 37 in the housing, which defines a pair of compartments 36 for retaining the optical elements 4. The compartments 36 are bordered at the top by a top wall having rectangular projections 38 for engagement with the EMI shield 5. Also, the compartments 36 include a lower series of rearward projections 39 for alignment of optical element leads 40.

The bodies of the optical elements 4 fit within the compartments 36 of the housing 3, so that their leads 40 extend downwardly from the connector, and so that they are optically aligned with the sockets 30. As is clear in the plan sectional views, inner ends of the sockets 30 project into the compartments 36, so that they abut optical parts 41, one an emitting diode lens and the other a detector diode lens, aligned with the sockets 30. The overall construction of the housing 3 is rigid around the outside, so that there is a small tolerance for registry of the optical elements 4 with the sockets 30.

The EMI shield 5 fits around the end of the housing 3 so that it surrounds the optical elements 4. It is best viewed in FIGS. 7 to 10. It is open at the lower side so that it can slide downwardly and fit into place. Top apertures 50 engage the projections 38 of the housing 3. Rear resilient springs 52 press against the rear of the elements 4 to help retain them in the optimum position. The shield 5 has a front wall 53 which overlies the partition wall 37 of the housing and shields the maximum possible area to the front of the elements 4. The shield 5 also has downwardly-projecting ground pins 54 for earth connection. Also, there are tabs 55 for folding under the housing 3 and tabs 57 for folding into the housing 3 to retain the shield 5 in place. The shield 5 also has a central divider 56 between the elements 4. The divider 56 has a lower projection for engagement with a substrate and holding the divider 56 in place against the spring force exerted by the springs 52.

The arrangement of the shield 5 not only provides for EMI shielding, but also optical shielding between the optical elements 4 within the connector 1, and retention of the optical elements 4 in position.

Figure 1:
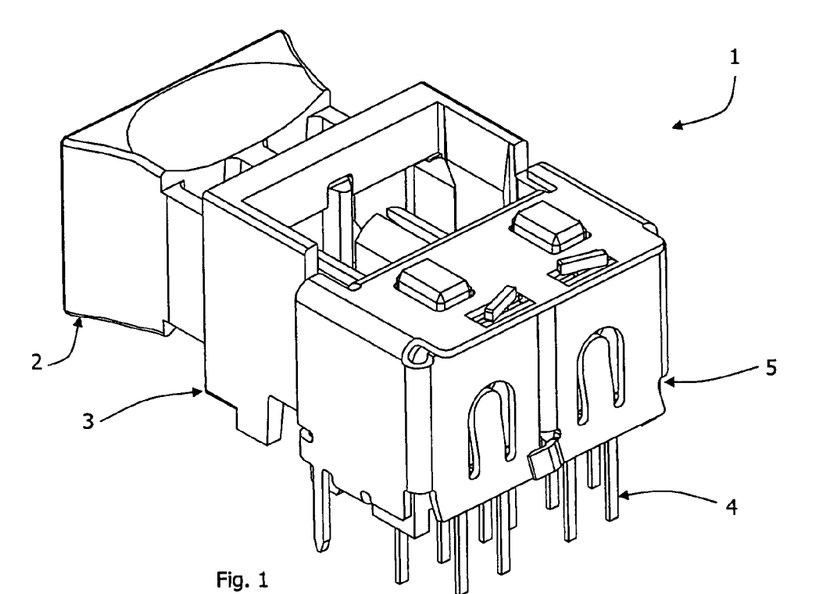
FIGS. 1 and 2 are perspective views of an optical connector of the invention, for coupling of two fibres to transmitter and receiver optical elements.
Figure 2:
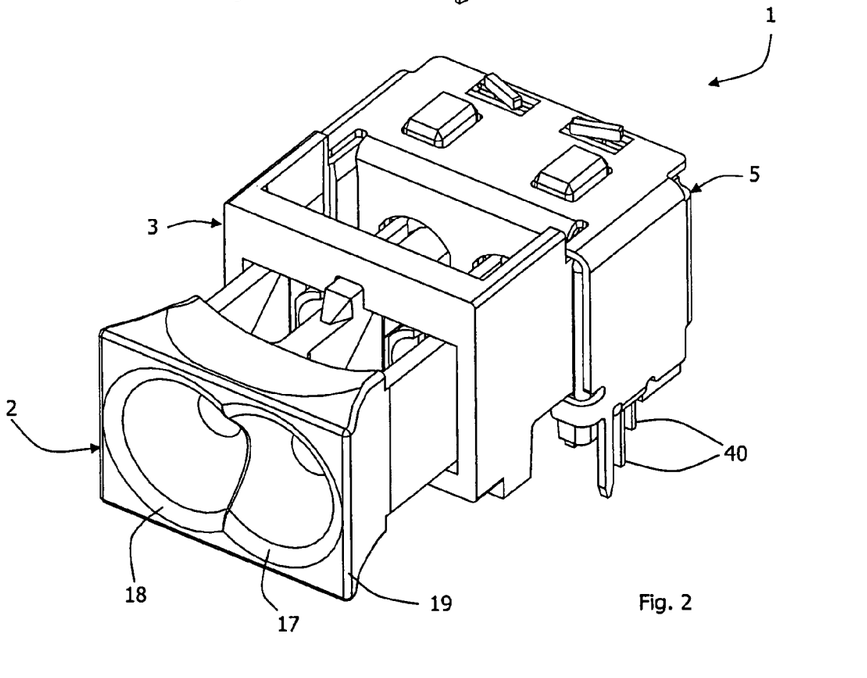
Figure 3:
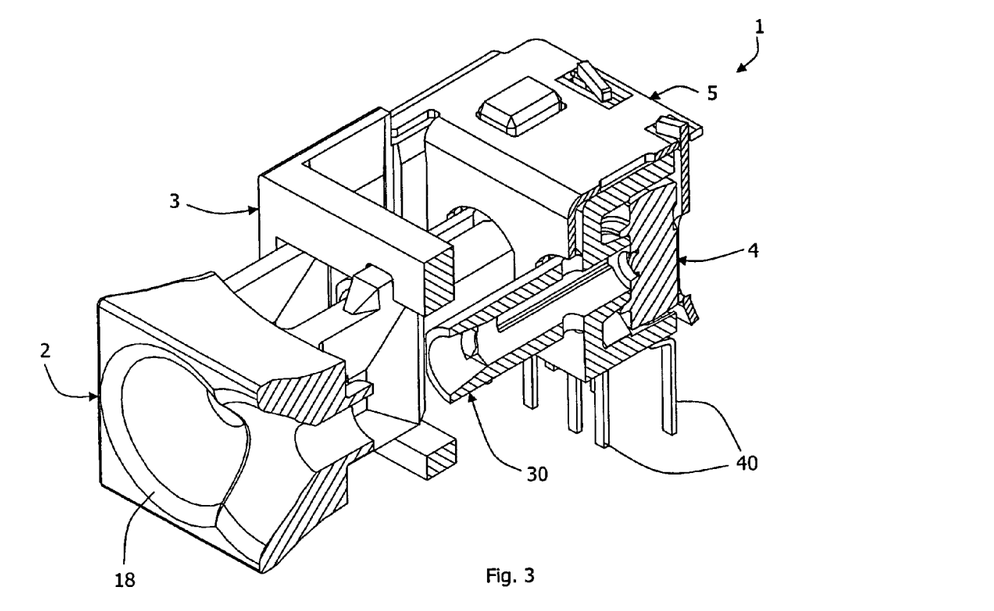
FIG. 3 is a perspective view of the connector with a vertical cut-away section.
Figure 4:
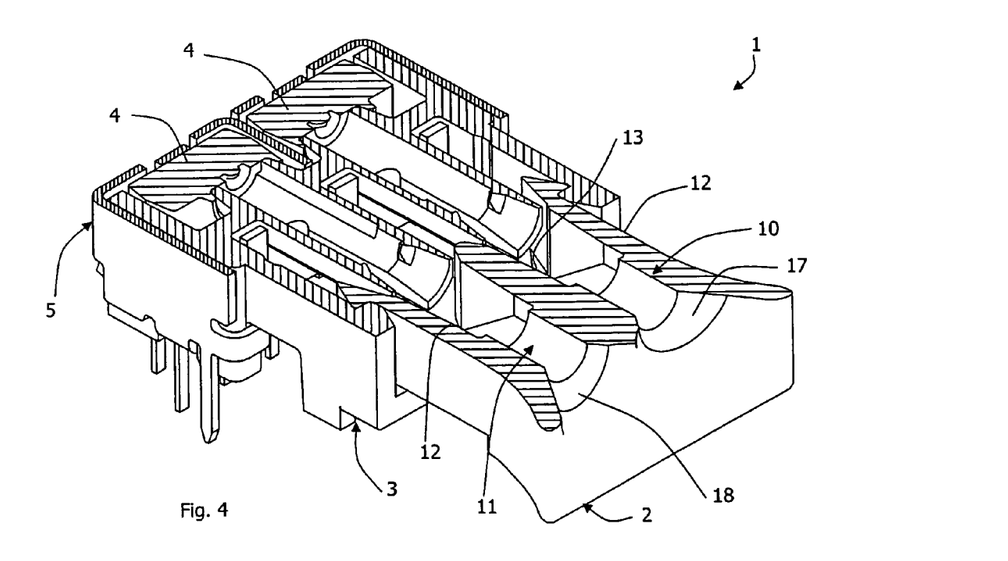
FIG. 4 is a perspective view with a horizontal cut-away section.
Figure 5:
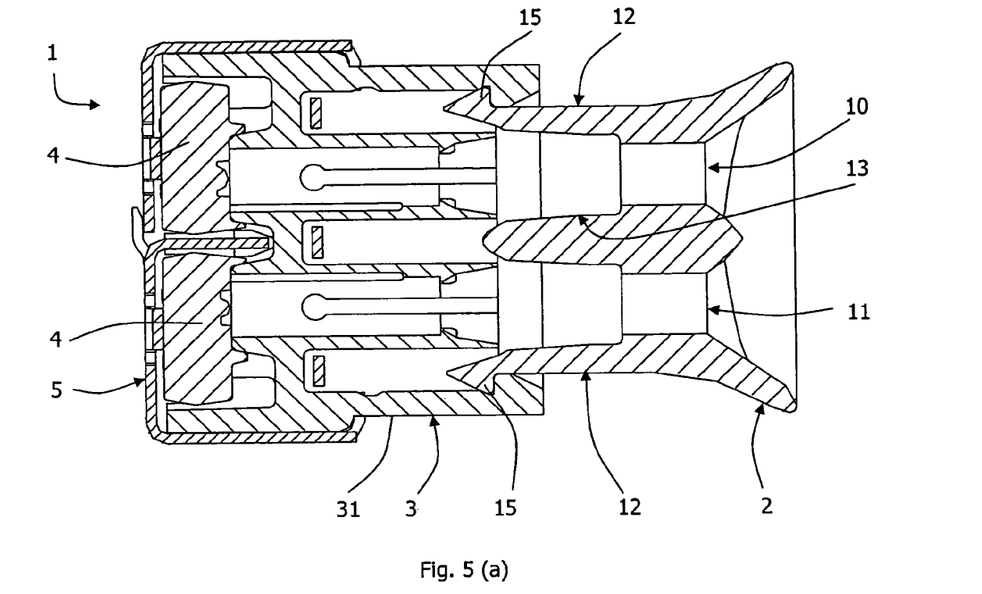
FIGS. 5(a), 5(b) and 5(c) are plan cross-sectional views showing insertion of a clamp into a housing of the connector.
Figure 6:
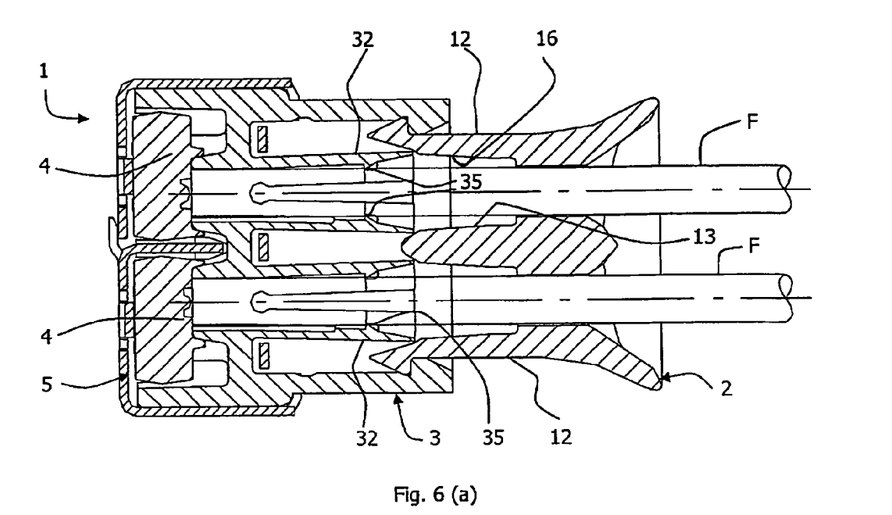
FIGS. 6(a), 6(b) and 6(c) are similar views of the connector, but including fibre terminations being secured in place.
Figure 7:
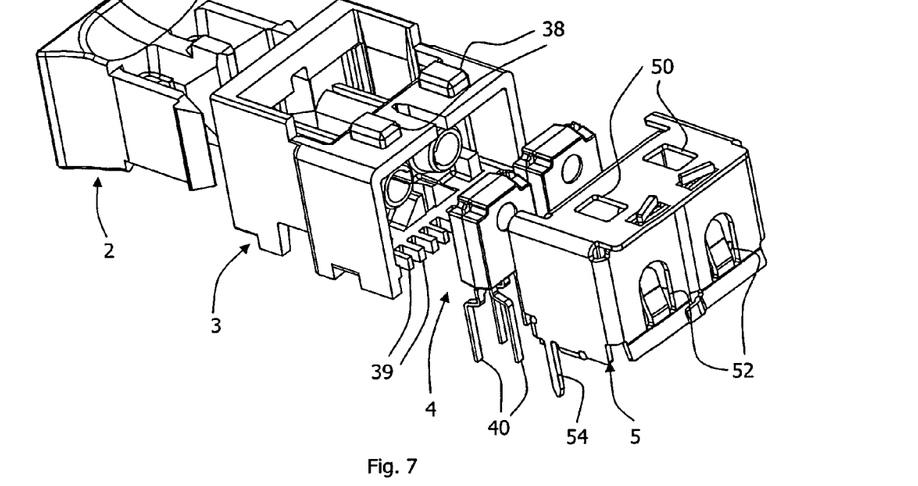
FIGS. 7 and 8 are top perspective exploded views of the connector from right and left sides respectively.
Figure 8:
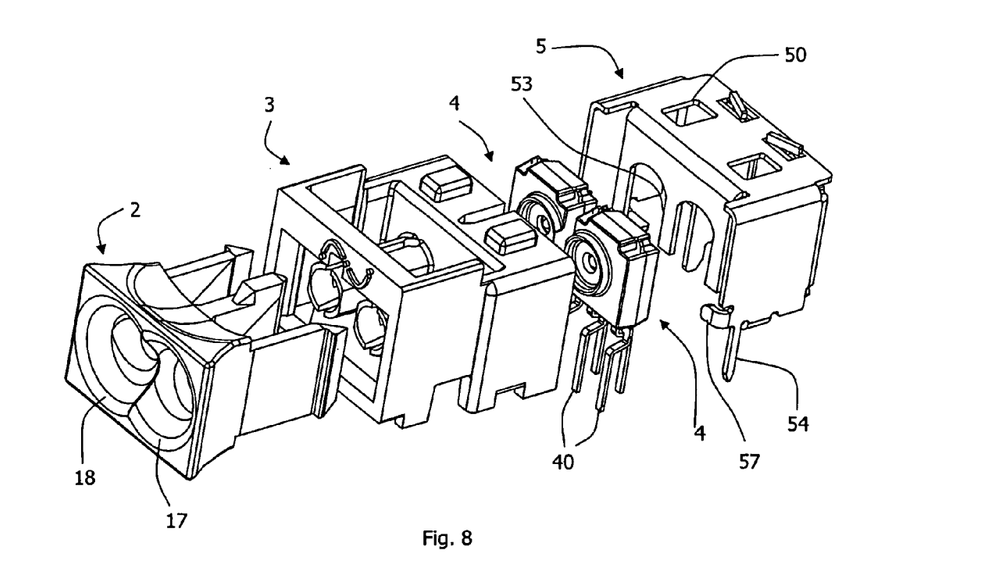
Figure 9:
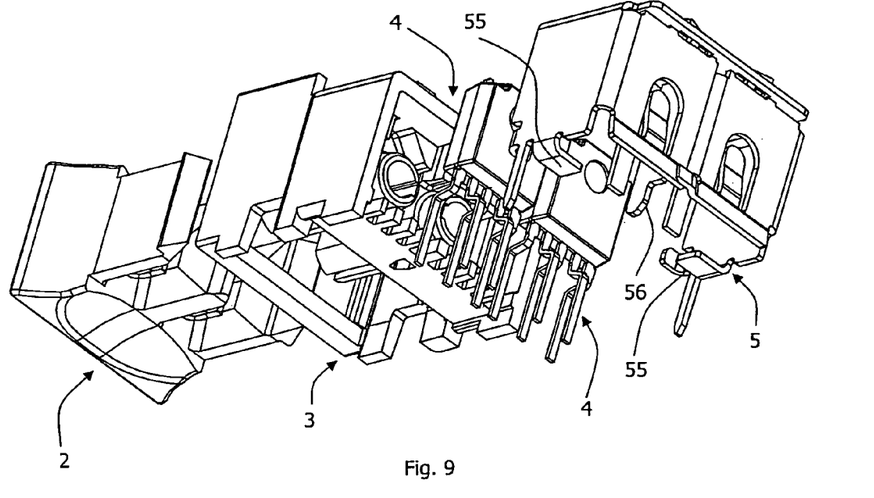
FIGS. 9 and 10 are underneath perspective exploded views of the connector.
Figure 10:
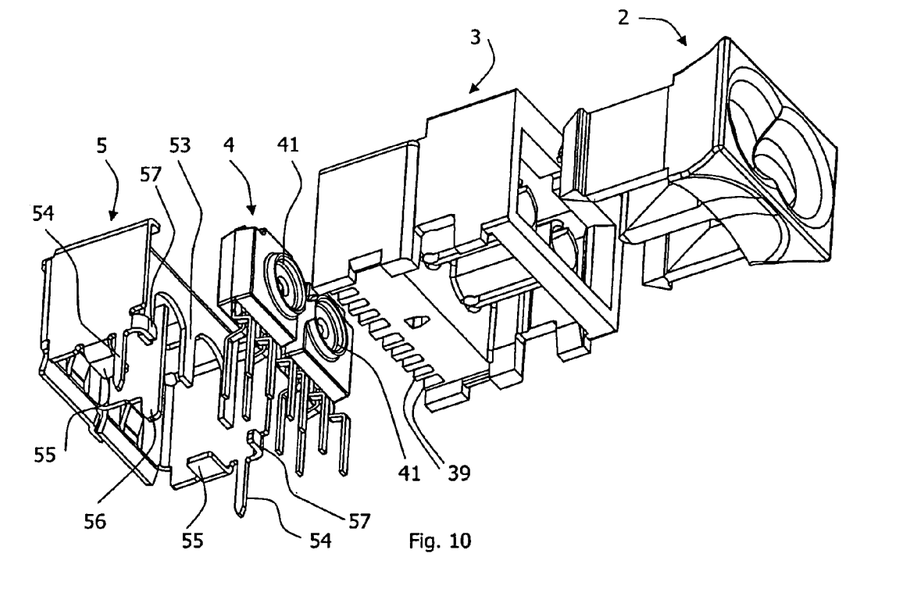

In use, the coupler 1 may be mounted at the edge of a circuit board so that the outer ends of the sockets 30 face outwardly. The leads 40 of the optical elements 4 are engaged in plated through holes of the board, as are the ground pins 54 of the EMI shield 5. As shown in FIGS. 6(*a*) to (*c*), while the clamp 2 is disengaged from the housing 3, fibre terminations F are inserted through the clamp mouths 17 and 18 and the through-holes 10 and 11 and into the sockets 30 of the housing 3. This is particularly convenient because of the configuration of the mouths 17 and 18.

The clamp 2 is then simply pushed inwardly so that the teeth 15 disengage from the outer recesses 21, slide within the receivers 20, and engage with the inner recesses 22. During this movement, tapered surfaces 16 of the clamp elements 12 gradually urge the side walls 32 of the sockets 30 to a closed position and simultaneously the central clamp member 13 tapered surfaces urge the socket inner walls 33 to a closed position. At the clamp 3 closed position, the ridges 35 pinch the fibres F to retain them into position, their ends abutting the elements 4 at the inner ends of the sockets 30. This final closed position is shown most clearly in FIG. 6(*c*). The movement of the clamp 2 towards the closed position is particularly convenient because of the finger-grip portion 19.

It will be appreciated that the coupler provides very effective gripping of fibres at correct positions for coupling with optical elements, and that it is very simple to operate.

In the above embodiment, the connector is for two fibres, and this is particularly convenient as it is often desirable to couple with both a transmitter element and with a receiver element at the same physical location. However, in another embodiment the same principles are applied for only one fibre and one element. Also, in other embodiments the fibre or fibres are not coupled to optical elements but instead to other fibres.

Figure 11:
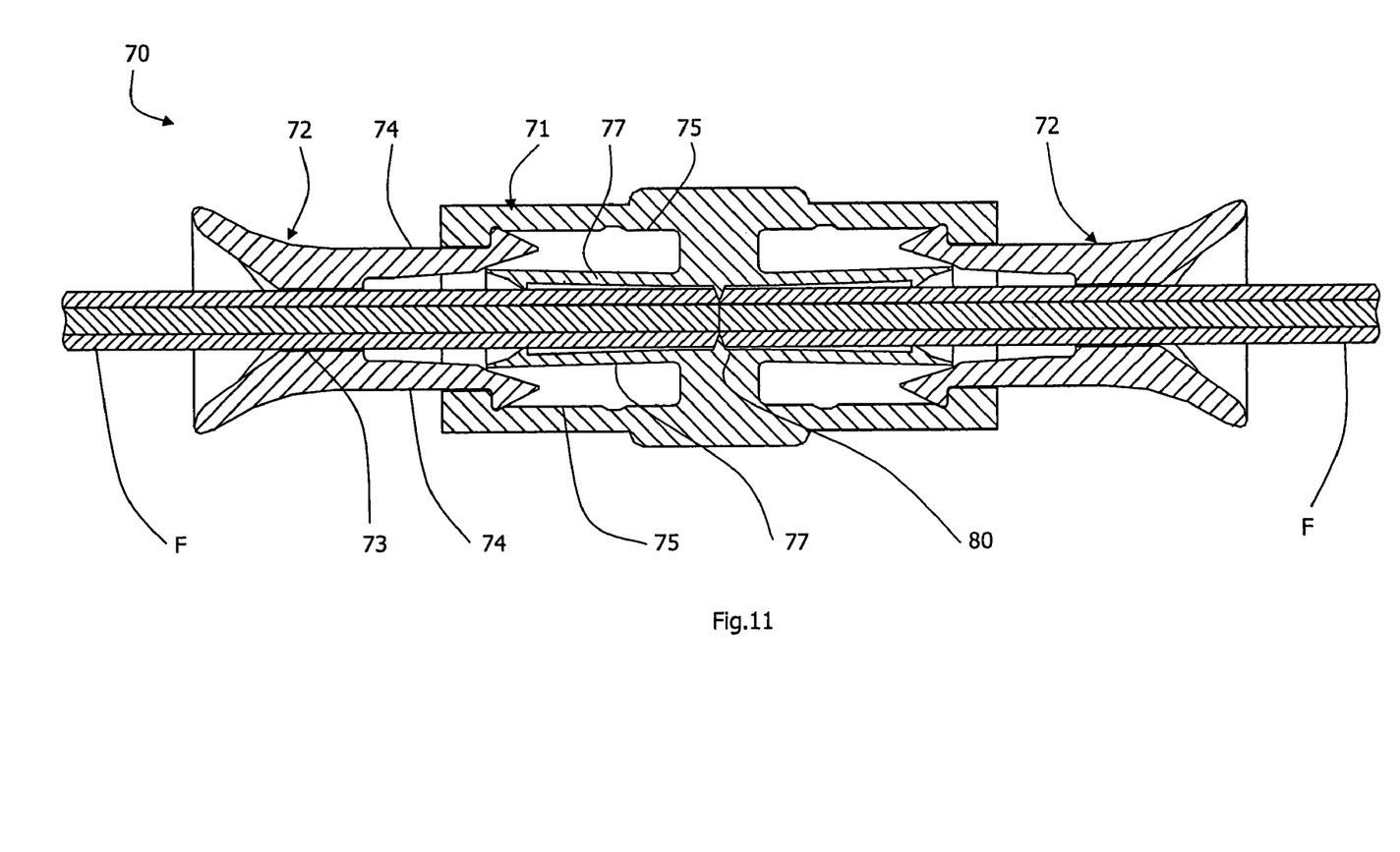
FIGS. 11 and 12 are plan cross-sectional views of different end-to-end, connectors of the invention, for accommodating a single fibre at each end.

Referring to FIG. 11 a coupler 70 has a housing 71 which is symmetrical, and there is a clamp 72 at each end. Each clamp 72 has a through-hole 73 and a pair of resilient clamp members 74. The clamp members 74 slide within receivers 75 of the housing 71 between outer and inner positions to retain a fibre F in a socket 77 which is akin to the socket 30 of the coupler 1. At their inner ends, the sockets 77 have tapered shoulders 80 for engaging the ends of the fibres F so that opposed fibres abut each other with accurate alignment.

Figure 12:
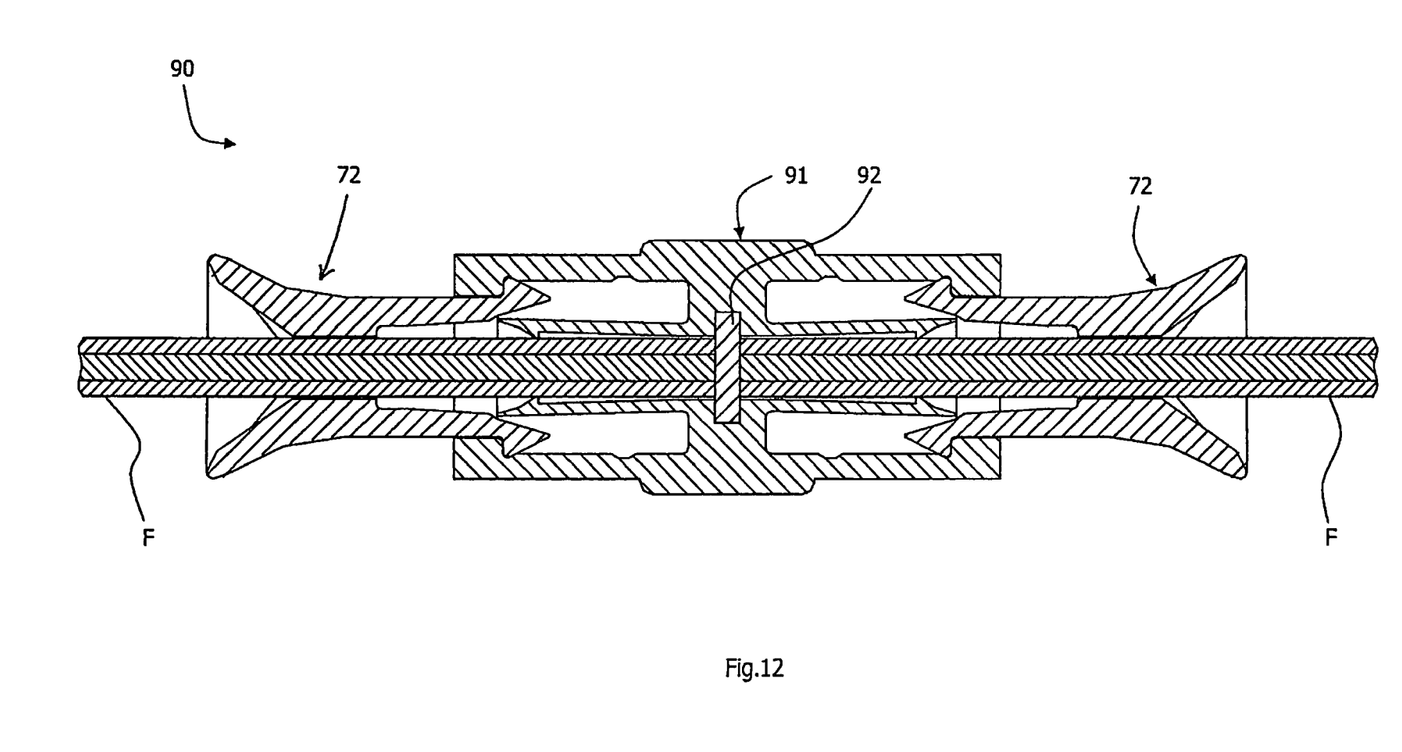

Referring to FIG. 12, a coupler 90 is also for butting two fibres, one entering from each end. The coupler 90 has a symmetrical housing 91, and a clamp 72 at each end for movement in the same manner as in the coupler 70. However, in this case the housing 91 has a central transparent membrane 92 between the ends of the fibres.

Figure 13:
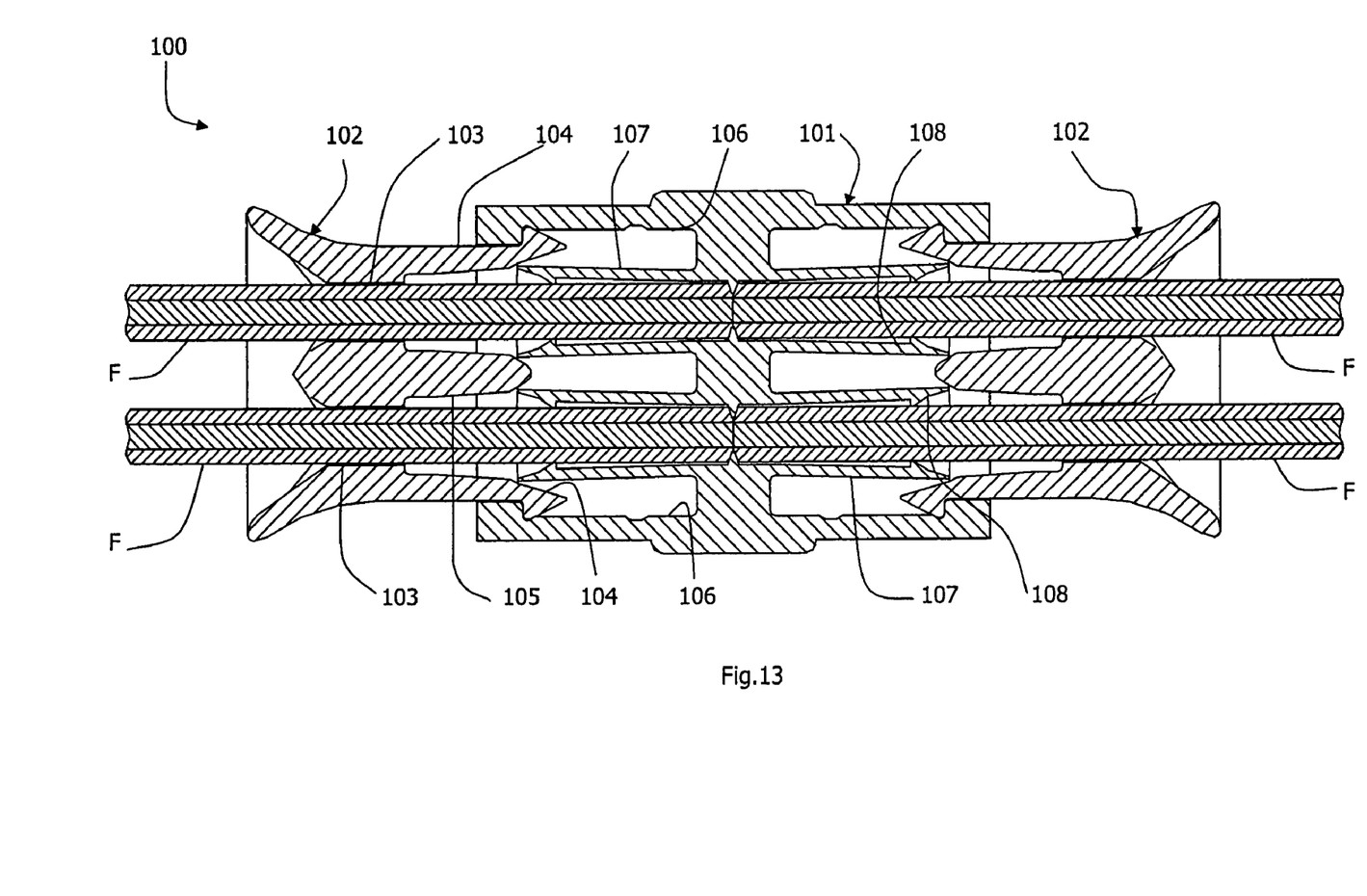
FIGS. 13 and 14 are plan cross-sectional views of different end-to-end connectors of the invention, for accommodating two fibres at each end.
Figure 14:
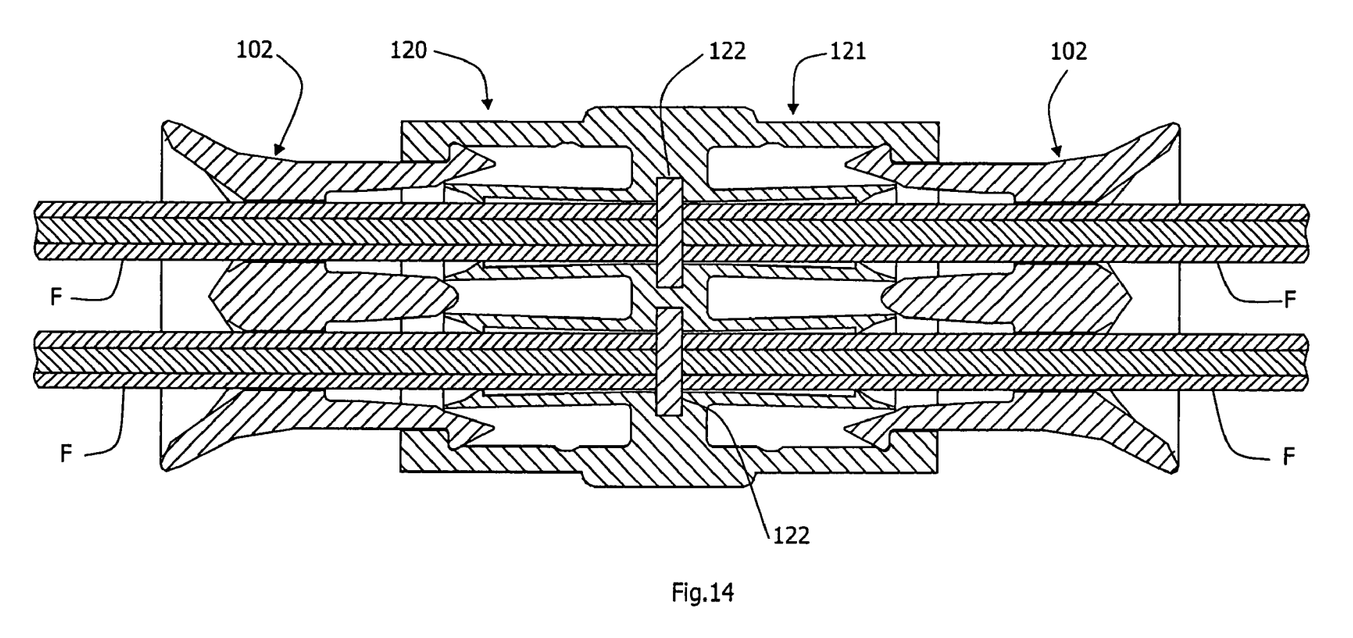

The fibre-to-fibre coupling can also be achieved for a pair of fibres at each end, as shown in FIGS. 13 and 14. Referring to FIG. 13 a coupler 100 has a symmetrical housing 101 and a clamp 102 at each end. Each clamp 102 has a pair of through-holes 103, a pair of side resilient clamp members 104, and a central clamp member 105. The housing 101 has receivers 106 and socket resilient walls 107 and 108. The coupler operates in a manner akin to the connector 1, in this case bringing two fibres F in each end so that opposed fibres about each other at the centre of the housing 101.

Referring to FIG. 14, a coupler 120 has a housing 121, and there is a clamp 102 at each end. This operates in the same manner as the coupler 100, except that there is a transparent membrane 122 separating the fibre ends. Thus, the fibres F can be pushed conveniently against the relevant faces of the membrane 122 for passage of light through to the other fibre.

The invention is not limited to the embodiments described but may be varied in construction and detail. For example, it is not essential that the sockets have ridges or teeth for pinching the fibre, as instead they may have roughened surfaces for gripping the fibres as they press against them. Also, it is envisaged that there may not be a clamp member sliding against a housing wall. For example, the clamp may be in the form of a cylinder with a tapered internal surface, which is pushed over the socket.

The invention claimed is:

1. An optical connector comprising:
   a housing comprising:
      at least two sockets, each socket being configured to receive a fibre termination, each socket having a resilient wall for pressing against a fibre termination inserted in the socket, and
      at least two of said sockets have a resilient wall facing each other; and
   a clamp including at least one central clamp member for sliding in the housing in a direction generally parallel to and between said two sockets, said central clamp member sliding in contact with the two socket resilient walls so that it laterally urges each of them to grip a fibre termination.

2. The connector as claimed in claim 1, wherein the clamp further comprises a through hole, each for guiding through the clamp and into a socket.

3. The connector as claimed in claim 2, wherein each through hole has a tapered mouth.

4. The connector as claimed in claim 2, wherein the clamp is wider at the mouth to provide a finger-grip portion.

5. The connector as claimed in claim 2, wherein the clamp is wider at the mouth to provide a finger-grip portion; and wherein lateral external surfaces of the clamp are curved outwardly and laterally towards an outer extremity of the clamp.

6. The connector as claimed in claim 1, wherein the socket resilient walls each have a projection for pinching a fibre termination in the socket.

7. The connector as claimed in claim 1, wherein each socket comprises a pair of opposed resilient walls, each for lateral movement for gripping a fibre termination.

8. The connector as claimed in claim 1, wherein the central clamp member has tapered surfaces for sliding engagement with the socket resilient walls.

9. The connector as claimed in claim 1, wherein each socket comprises a longitudinal recess to accommodate excess material along the length of a fibre termination.

10. The connector as claimed in claim 1, wherein the housing further comprises a compartment for retaining an optical element in registry with a fibre termination in the socket.

11. The connector as claimed in claim 10, wherein the compartment is behind a separating wall through which each socket passes.

12. The connector as claimed in claim 10, further comprising a metal shield partly surrounding the compartment, and a formation for engagement with the metal shield.

13. The connector as claimed in claim 10, wherein the compartment comprises divider projections for alignment of optical element legs.

14. The connector as claimed in claim 10, further comprising a metal shield partly surrounding the compartment, and a formation for engagement with the metal shield; and wherein the shield has five sides, with an open bottom end for sliding downwardly around the compartment, and the shield has at least one tab for folding to engage the housing to retain the shield in place.

15. The connector as claimed in claim 10, further comprising a metal shield partly surrounding the compartment, and a formation for engagement with the metal shield; and wherein the shield has five sides, with an open bottom end for sliding downwardly around the compartment.

16. The connector as claimed in claim 10, further comprising a metal shield partly surrounding the compartment, and a formation for engagement with the metal shield; and wherein the shield includes a dividing wall for separation of optical elements to provide optical and/or electromagnetic shielding between adjacent optical elements in the compartment.

17. The connector as claimed in claim 1, wherein the housing comprises at least two aligned pairs of sockets and there is a clamp at each end of the housing for clamping opposed fibre terminations in an end-to-end configuration.

18. The connector as claimed in claim 17, wherein the housing comprises a transparent membrane between the aligned sockets.

19. The connector as claimed in claim 17, wherein the sockets are arranged for abutment of opposed fibre termination ends, with a restriction to limit fibre movement at an abutment position.

20. The connector as claimed in claim 10, further comprising a metal shield partly surrounding the compartment, and a formation for engagement with the metal shield; and wherein the shield further comprises a portion configured to retain optical elements in position in the compartment.

21. The connector as claimed in claim 1, wherein the clamp and the housing include features which engage to limit movement of the clamp between an inner position and an outer position.

\* \* \* \* \*